United States Patent
Redon

(10) Patent No.: US 9,995,201 B2
(45) Date of Patent: Jun. 12, 2018

(54) LOW REACTIVITY, COMPRESSION-IGNITION, OPPOSED-PISTON ENGINE

(71) Applicant: ACHATES POWER, INC., San Diego, CA (US)

(72) Inventor: Fabien G. Redon, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 0 days. days.

(21) Appl. No.: 15/116,765

(22) PCT Filed: Feb. 11, 2015

(86) PCT No.: PCT/US2015/015365
§ 371 (c)(1),
(2) Date: Aug. 4, 2016

(87) PCT Pub. No.: WO2015/123262
PCT Pub. Date: Aug. 20, 2015

(65) Prior Publication Data
US 2016/0369686 A1    Dec. 22, 2016

Related U.S. Application Data

(60) Provisional application No. 61/939,170, filed on Feb. 12, 2014.

(51) Int. Cl.
*F02B 75/28* (2006.01)
*F01B 7/02* (2006.01)
(Continued)

(52) U.S. Cl.
CPC ............... *F02B 7/04* (2013.01); *F01B 7/02* (2013.01); *F01B 7/14* (2013.01); *F02B 7/02* (2013.01);
(Continued)

(58) Field of Classification Search
CPC .......... F02B 75/28; F02B 75/282; F01B 7/02; F02D 19/06; F02D 19/061;
(Continued)

(56) References Cited

U.S. PATENT DOCUMENTS 2,767,691 A    10/1956  Mengelkamp et al. ...... 123/1 R
4,215,660 A     8/1980  Finley .......................... 123/48 B
(Continued)

FOREIGN PATENT DOCUMENTS

JP    1998-238374    9/1998
JP    2013-534295    9/2013
(Continued)

OTHER PUBLICATIONS

International Search Report and Written Opinion for PCT application PCT/US2015/015365, dated May 6, 2015.
(Continued)

*Primary Examiner* — Erick Solis
(74) *Attorney, Agent, or Firm* — Terrance A. Meador

(57) ABSTRACT

A compression-ignition, opposed-piston engine using a low reactivity fuel as an ignition medium manages trapped temperature and trapped combustion residue within, and fuel injection into, the combustion chambers of the engine, and controls the compression ratio of the engine in order to realize reductions in emissions as well as improved fuel consumption efficiencies.

10 Claims, 6 Drawing Sheets

(51) Int. Cl.

| | | |
|---|---|---|
| *F02D 19/06* | (2006.01) | |
| *F02B 7/04* | (2006.01) | |
| *F02D 19/08* | (2006.01) | |
| *F02B 7/02* | (2006.01) | |
| *F02B 25/08* | (2006.01) | |
| *F01B 7/14* | (2006.01) | |
| *F02B 23/06* | (2006.01) | |
| *F02B 75/02* | (2006.01) | |
| *F02B 75/04* | (2006.01) | |

(52) U.S. Cl.
CPC .......... *F02B 23/0624* (2013.01); *F02B 25/08* (2013.01); *F02B 75/02* (2013.01); *F02B 75/04* (2013.01); *F02B 75/28* (2013.01); *F02B 75/282* (2013.01); *F02D 19/06* (2013.01); *F02D 19/0615* (2013.01); *F02D 19/0649* (2013.01); *F02D 19/081* (2013.01); *F02B 2075/025* (2013.01); *Y02T 10/12* (2013.01); *Y02T 10/125* (2013.01)

(58) Field of Classification Search
CPC ............. F02D 19/0613; F02D 19/0615; F02D 19/0649; F02D 19/081; F02D 41/0025
USPC ......... 123/51 B, 51 BA, 51 BB, 51 BD, 299, 123/301, 304, 306, 308, 575–578
See application file for complete search history.

(56) References Cited

U.S. PATENT DOCUMENTS

| | | | | |
|---|---|---|---|---|
| 4,635,590 | A | 1/1987 | Gerace | 123/23 R |
| 5,058,537 | A * | 10/1991 | Paul | F01B 7/14 |
| | | | | 123/193.6 |
| 6,230,683 | B1 * | 5/2001 | zur Loye | F02B 1/12 |
| | | | | 123/27 GE |
| 8,549,854 | B2 | 1/2013 | Dion et al. | 60/605.2 |
| 2005/0103287 | A1 * | 5/2005 | Hofbauer | F02B 1/12 |
| | | | | 123/46 E |
| 2006/0037567 | A1 * | 2/2006 | Thomas | F02B 19/12 |
| | | | | 123/56.7 |
| 2010/0282219 | A1 | 11/2010 | Alonso | 123/51 AA |
| 2011/0220058 | A1 | 9/2011 | Cleeves et al. | 123/295 |
| 2011/0271931 | A1 | 11/2011 | Fuqua et al. | 123/301 |
| 2011/0271932 | A1 | 11/2011 | Fuqua et al. | 123/301 |
| 2011/0289916 | A1 | 12/2011 | Dion et al. | 60/605.2 |
| 2012/0085302 | A1 * | 4/2012 | Cleeves | 123/48 R |
| 2012/0112468 | A1 * | 5/2012 | Najt | F01B 11/007 |
| | | | | 290/1 A |
| 2012/0125291 | A1 * | 5/2012 | Simpson | F02B 71/04 |
| | | | | 123/46 E |
| 2013/0104848 | A1 * | 5/2013 | Klyza | F02M 69/04 |
| | | | | 123/445 |
| 2013/0174548 | A1 | 7/2013 | Dion | 60/605.2 |
| 2013/0213342 | A1 | 8/2013 | Burton et al. | 123/193.6 |
| 2014/0014063 | A1 | 1/2014 | Redon | 123/295 |
| 2014/0026563 | A1 | 1/2014 | Dion et al. | 60/605.2 |
| 2014/0083396 | A1 | 3/2014 | Burton et al. | 123/51 R |
| 2014/0182549 | A1 * | 7/2014 | Cleeves | F01N 3/005 |
| | | | | 123/429 |
| 2014/0299109 | A1 | 10/2014 | Fuqua et al. | 123/51 R |
| 2014/0373814 | A1 | 12/2014 | Herold et al. | 123/51 B |
| 2014/0373815 | A1 | 12/2014 | Nagar et al. | 123/51 B |
| 2014/0373816 | A1 | 12/2014 | Nagar | 123/51 B |
| 2015/0114372 | A1 * | 4/2015 | Cobb | F02B 27/04 |
| | | | | 123/65 EM |
| 2015/0122227 | A1 | 5/2015 | Abani et al. | F02B 71/00 |
| 2015/0128907 | A1 | 5/2015 | Redon | F02B 75/12 |
| 2016/0017839 | A1 * | 1/2016 | Johnson | F02F 1/183 |
| | | | | 123/657 |

FOREIGN PATENT DOCUMENTS

| | | |
|---|---|---|
| WO | WO-2006/105390 A1 | 10/2006 |
| WO | WO-2009/061873 A2 | 5/2009 |
| WO | WO-2012/023975 A1 | 2/2012 |
| WO | WO 2012/023975 A1 | 2/2012 |

OTHER PUBLICATIONS

Non-Final Office Action dated Dec. 30, 2016, for U.S. Appl. No. 15/229,960.
Final Office Action dated May 8, 2017, for U.S. Appl. No. 15/229,960.
Notice of Allowance dated Aug. 16, 2017, for U.S. Appl. No. 15/229,960.
Examination Report dated Feb. 1, 2018 for European Patent Application No. 17152405.1.
Office Action dated Nov. 28, 2017 for Japanese patent application No. 2016-551196.
Notice of Allowance dated Mar. 28, 2018, for U.S. Appl. No. 15/229,960.

* cited by examiner

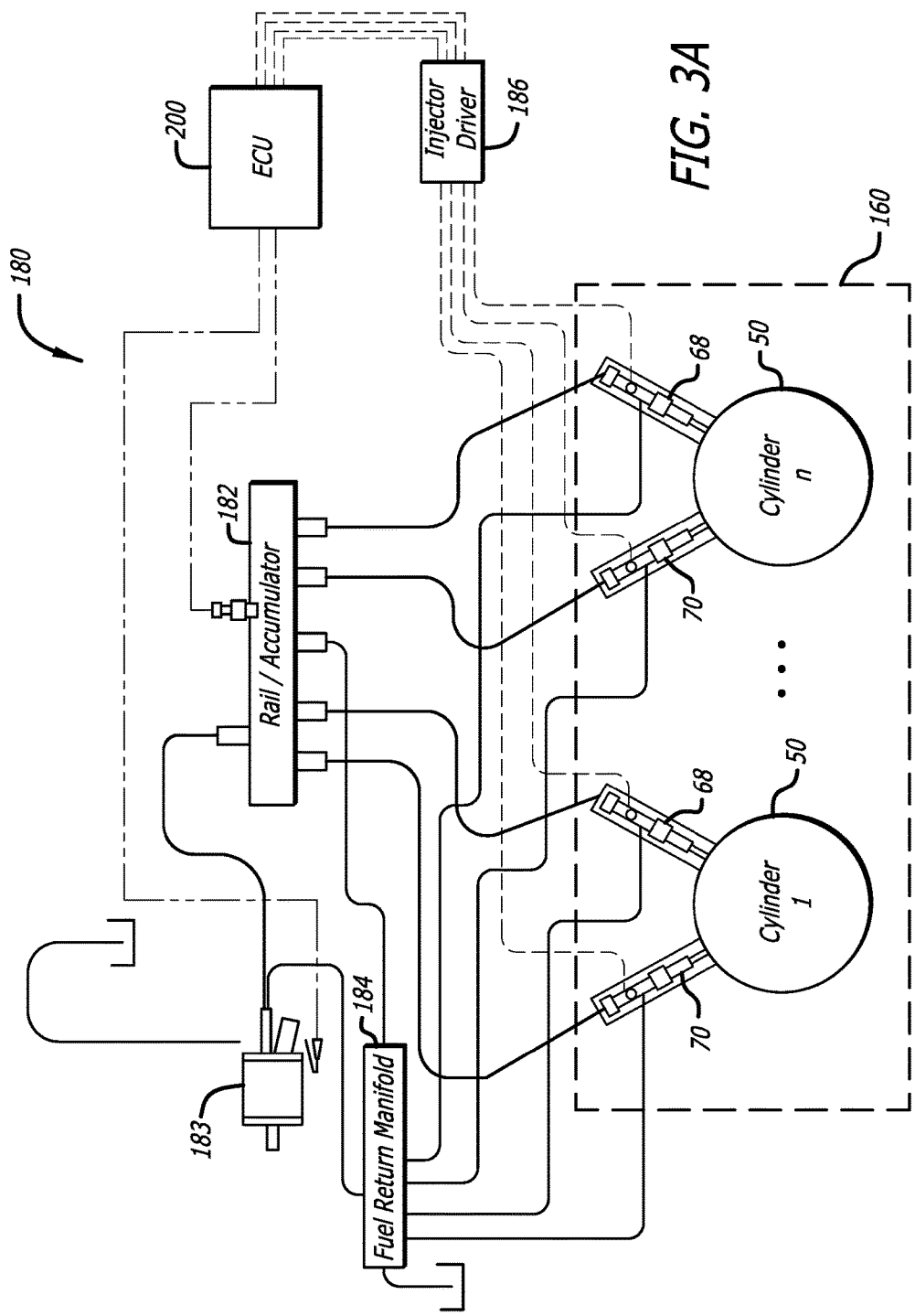

LOW REACTIVITY, COMPRESSION-IGNITION, OPPOSED-PISTON ENGINE

PRIORITY

This application is a U.S. national phase application filed under 35 U.S.C. 371 of international application no. PCT/US2015/015365, filed on 11 Feb. 2015, which claims priority to U.S. provisional application No. 61/939,170, filed on 12 Feb. 2014.

BACKGROUND

The field is two-stroke cycle opposed-piston engines. More specifically the application relates to a low reactivity, compression-ignition (LRCI), opposed-piston engine.

A compression-ignition engine for a vehicle is an internal combustion engine in which the heat of compressed air ignites fuel injected into, and mixed with, the air as it is compressed. A two-stroke cycle engine is a type of compression-ignition engine that completes a power cycle with a single complete rotation of a crankshaft and two strokes of a piston connected to the crankshaft. An opposed-piston engine is a two-stroke cycle, compression-ignition, internal combustion engine in which two pistons are disposed in opposition in the bore of a cylinder for reciprocating movement in opposing directions. The cylinder has longitudinally-spaced inlet and exhaust ports that are located near respective ends of the cylinder. Each of the opposed pistons controls one of the ports, opening the port as it moves to a bottom center (BC) location, and closing the port as it moves from BC toward a top center (TC) location. One of the ports provides passage for the products of combustion out of the bore, the other serves to admit charge air into the bore; these are respectively termed the "exhaust" and "intake" ports. In a uniflow-scavenged opposed-piston engine, charge air enters a cylinder through its intake port as exhaust gas flows out of its exhaust port, thus gas flows through the cylinder in a single direction ("uniflow")—from intake port to exhaust port.

Air and exhaust products flow through the cylinder via an air handling system. Fuel is delivered by injection from a fuel delivery system. As the engine cycles, a control mechanization governs combustion by operating the air handling and fuel delivery systems in response to engine operating conditions. The air handling system may be equipped with an exhaust gas recirculation system to reduce undesirable compounds produced by combustion.

The continuous drive to reduce emissions and fuel consumption of internal combustion engines is pushing the exploration of new combustion regimes for existing engine types. Autoignition of low reactivity fuels, such as gasoline, has been tested in four-stroke internal combustion engines. When a low reactivity fuel is utilized in a compression-ignition engine without a spark plug for igniting the fuel, lower NOx and reduced particulate matter ("PM") aftertreatment can be realized in comparison to an internal combustion, compression-ignition engine using a high reactivity fuel such as diesel.

If a low reactivity fuel were to be utilized in a two-stroke cycle, compression-ignition, opposed-piston engine, even further reductions in emissions as well as improved fuel consumption efficiencies could be realized. The inherent advantage of the opposed-piston engine of surface-area-to-volume ratio provides lower fuel consumption while reducing emissions without the need for expensive after-treatments. Thus, it is a desirable objective to equip a two-stroke, compression-ignition, opposed piston engine for operation with a low reactivity fuel such as gasoline that will self-ignite in varying engine operating conditions without ignition assistance.

SUMMARY

A compression-ignition, opposed-piston engine using a self-igniting, low reactivity fuel manages trapped temperature and trapped combustion residue within the combustion chambers of the engine, thereby ensuring fuel ignition timed to avoid misfires at low loads and pre-ignition (knocks) at high loads.

In some aspects, a low reactivity, compression-ignition (LRCI) two-stroke cycle, opposed-piston engine includes multi-point fuel injection for each cylinder. In some particular aspects, a pair of opposing injectors is operated to inject opposing spray patterns of fuel into a combustion chamber so as to neutralize the spray momentum and reduce fuel impingement on the walls of the cylinder bore, which reduces coking and residue deposits on the cylinder bore.

BRIEF DESCRIPTION OF THE DRAWINGS

The below-described drawings are meant to illustrate principles and examples discussed in the following description. They are not necessarily to scale.

FIG. 3A is a schematic diagram showing details of a fuel injection system for a compression-ignition, opposed-piston engine according to this disclosure.

DETAILED DESCRIPTION

In this disclosure, "fuel" is material that may be ignited in an opposed-piston engine. The fuel may be a relatively homogeneous composition, a blend, a mixture of fuels, or separate injections of different fuels. For example, the fuel may be a liquid fuel. Fuels are classified by reactivity. In some aspects, low reactivity fuels have a strong resistance to auto-ignition, they are classified using the Octane rating, the higher the Octane rating, the more resistance to auto ignition. A mixture of air and low reactivity fuels is typically ignited in a combustion chamber with the assistance of a spark or a pilot injection. Low reactivity fuels have an Octane rating above 70. Examples of these fuels include gasoline and natural gas. High reactivity fuels ignite much more easily than low reactivity fuels; they are classified by their ignition quality called the Cetane number. The higher the Cetane number, the better the ignition quality. A mixture of this fuel with air is typically ignited by compressing it, the heat of the compressed air ignites the fuel and there is no need for ignition assistance. An example of high reactivity fuel is diesel. A high reactivity fuel has a Cetane number above 35.

According to this disclosure, low reactivity fuel, or a mixture of low and high reactivity fuels, is injected into compressed air in a combustion chamber formed between the end surfaces of opposed pistons when the pistons are at or near TC locations. In other aspects, injection may occur earlier in the compression stroke, soon after port closure. The air is preferably ambient air; however, it may include other components such as exhaust gases or other diluents. In any such case, the air is referred to as "charge air."

Figure 1:
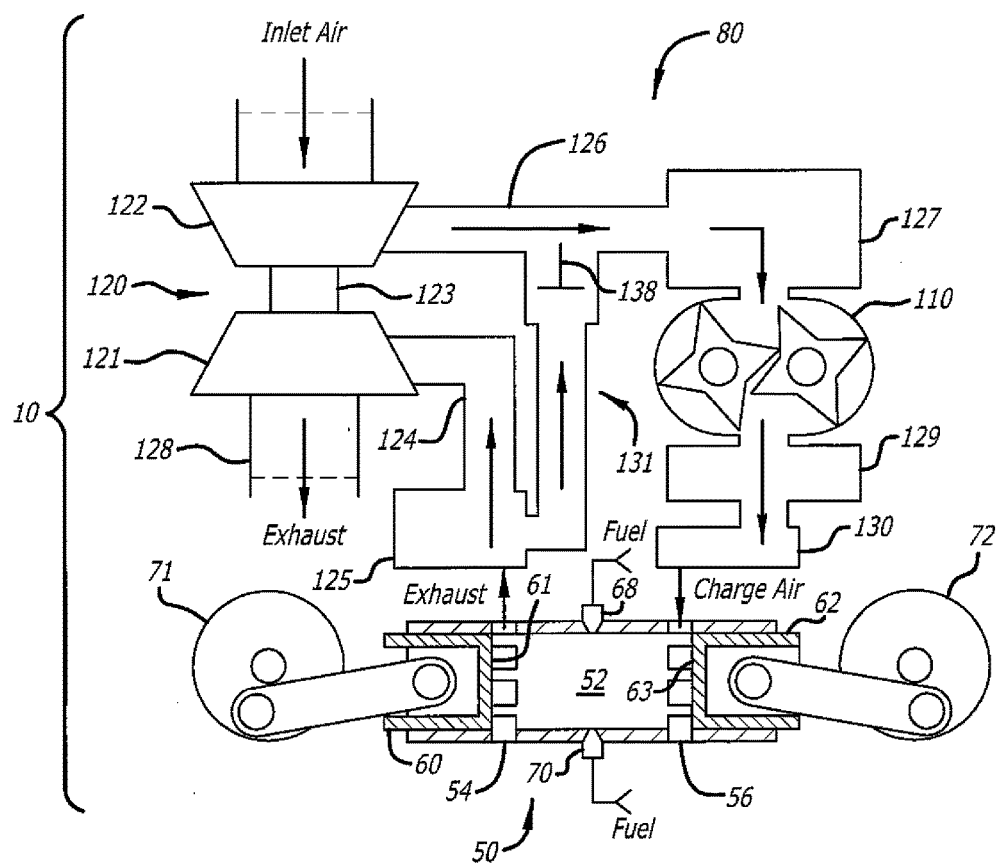
FIG. 1 is a schematic diagram of a prior art two-stroke cycle, opposed-piston engine constructed for compression ignition, and is appropriately labeled "Prior Art".

FIG. 1 illustrates a prior-art two-stroke cycle, compression-ignition, opposed-piston engine 10 as would be used, for example, in a vehicle. The engine 10 has at least one ported cylinder 50. For example, the engine may have one ported cylinder, two ported cylinders, three ported cylinders, or four or more ported cylinders. Each ported cylinder 50 has a bore 52 and longitudinally-spaced exhaust and intake ports 54 and 56 formed or machined in respective ends of a cylinder wall. Each of the exhaust and intake ports 54 and 56 includes one or more circumferential arrays of openings in which adjacent openings are separated by a solid bridge. In some descriptions, each opening is referred to as a "port"; however, the construction of a circumferential array of such "ports" is no different than the port constructions shown in FIG. 1. Pistons 60 and 62 are slidably disposed in the bore 52 with their end surfaces 61 and 63 opposing one another. The piston 60 controls the exhaust port 54, and the piston 62 controls the intake port 56. In the example shown, the engine 10 further includes at least one crankshaft; preferably, the engine includes two crankshafts 71 and 72. In the example shown, the exhaust pistons 60 of the engine are coupled to the crankshaft 71, and the intake pistons 62 of the engine are coupled to the crankshaft 72.

As the pistons 60 and 62 near TC, a combustion chamber is defined in the bore 52 between the end surfaces 61 and 63 of the pistons. Combustion timing is frequently referenced to the point in a compression cycle where minimum combustion chamber volume occurs; this point is referred to as "minimum volume." Fuel is injected directly into cylinder space located between the end surfaces 61 and 63. In some instances injection occurs at or near minimum volume; in other instances, injection may occur before minimum volume. Fuel is injected through fuel injector nozzles 68 and 70 positioned in respective openings through the sidewall of the cylinder 50. Preferably, the fuel injector nozzles 68 and 70 are positioned to inject respective sprays of fuel in opposing directions along a diameter of the bore 52. The fuel mixes with charge air admitted into the bore 52 through the intake port 56. As the air-fuel mixture is compressed between the end surfaces 61 and 63, the compressed air reaches a temperature that causes the fuel to ignite. Combustion follows.

With further reference to FIG. 1, the engine 10 includes an air handling system 80 that manages the transport of charge air provided to, and exhaust gas produced by, the engine 10. A representative air handling system construction includes a charge air subsystem and an exhaust subsystem. In the air handling system 80, a charge air source receives fresh air and processes it into charge air. The charge air subsystem receives the charge air and transports it to the at least one intake port of the engine. The exhaust subsystem transports exhaust products from exhaust ports of the engine for delivery to other exhaust components.

The air handling system 80 includes a turbocharger 120 with a turbine 121 and a compressor 122 that rotate on a common shaft 123. The turbine 121 is coupled to the exhaust subsystem and the compressor 122 is coupled to the charge air subsystem. The turbocharger 120 extracts energy from exhaust gas that exits the exhaust ports 54 and flows into an exhaust channel 124 directly from the exhaust ports 54, or from an exhaust manifold assembly 125 that collects exhaust gasses output through the exhaust ports 54. In this regard, the turbine 121 is rotated by exhaust gas passing through it into an exhaust outlet 124. This rotates the compressor 122, causing it to generate charge air by compressing fresh air. The charge air subsystem includes a supercharger 110 and an intake manifold 130. The charge air subsystem further includes at least one air cooler coupled to receive and cool the charge air before delivery to the intake port or ports of the engine. The charge air output by the compressor 122 flows through a charge air channel 126 to a cooler 127, whence it is pumped by the supercharger 110 to the intake ports. Charge air compressed by the supercharger 110 is output to an intake manifold 130. The intake ports 56 receive charge air pumped by the supercharger 110, through the intake manifold 130. Preferably, in multi-cylinder opposed-piston engines, the intake manifold 130 is constituted of an intake plenum that communicates with the intake ports 56 of all cylinders 50. A second cooler 129 may be provided between the output of the supercharger 110 and the input to the intake manifold 130.

In some aspects, the air handling system 80 may be constructed to reduce NOx emissions produced by combustion by recirculating exhaust gas through the ported cylinders of the engine. The recirculated exhaust gas is mixed with charge air to lower peak combustion temperatures, which reduces production of NOx. This process is referred to as exhaust gas recirculation ("EGR"). The EGR construction shown obtains a portion of the exhaust gasses flowing from the port 54 during scavenging and transports them via an EGR channel 131 external to the cylinder into the incoming stream of fresh intake air in the charge air subsystem. The recirculated exhaust gas flows through the EGR channel 131 under the control of a valve 138 (this valve may also be referred to as the "EGR valve").

Figure 2:
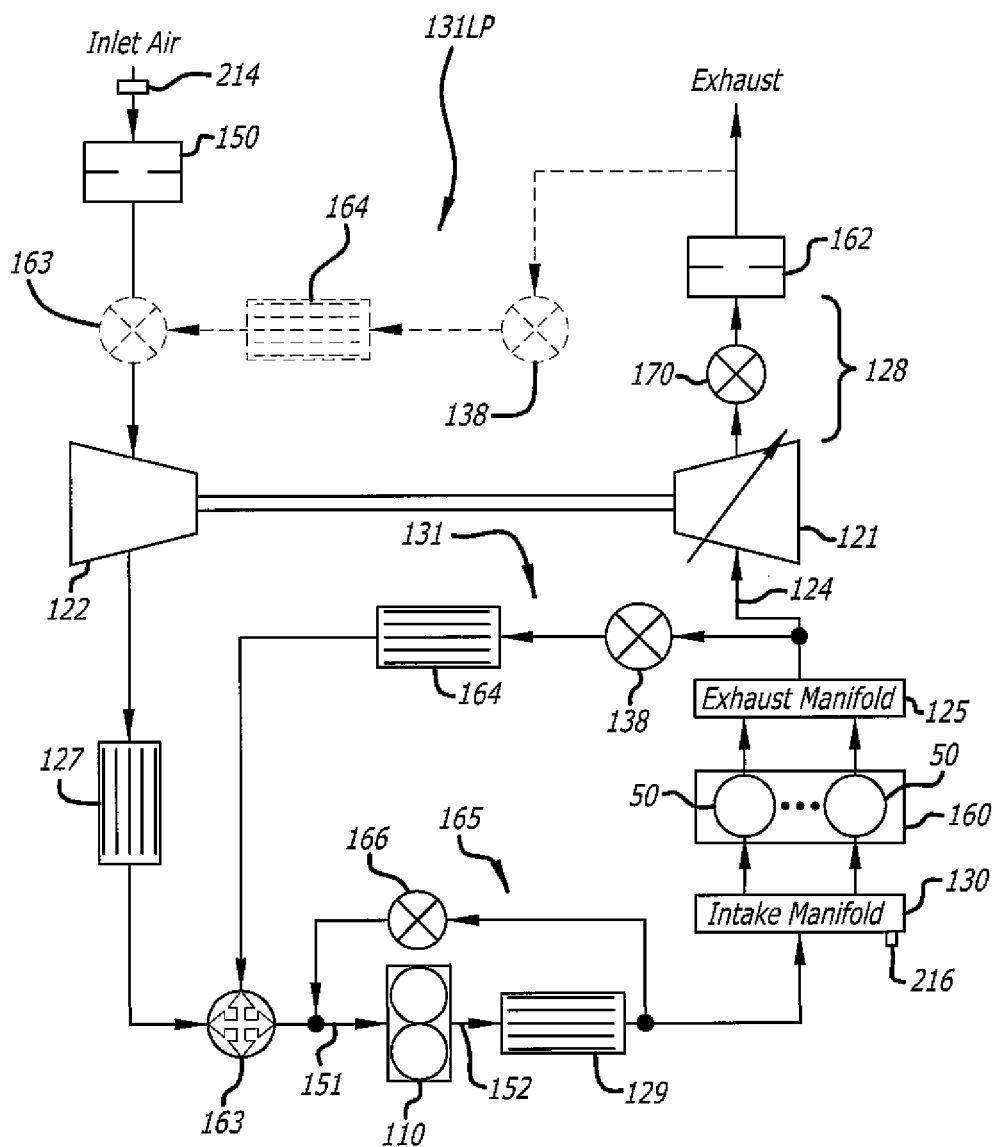
FIG. 2 is a schematic diagram showing details of an air handling system for a compression-ignition, opposed-piston engine according to this disclosure.

Using the engine of FIG. 1 as a basis, FIG. 2 shows modifications and additions with which the air handling system 80 may be configured to implement a low-reactivity combustion operation according to this specification. In this regard, the charge air subsystem provides inlet air to the compressor 122 via an air filter 150. As the compressor is rotated, the compressed inlet air flows through the cooler 127 into the inlet 151 of the supercharger 110. Air pumped by the supercharger 110 flows through the supercharger's outlet 152 into the intake manifold 130. Pressurized charge air is delivered from the intake manifold 130 to the intake ports of the cylinders 50, which are supported in an engine block 160. In some instances, although not necessarily, the second cooler 129 is provided in the charge air subsystem, in series between the output of the supercharger 110 and the intake manifold 130. In other instances, there may be no second cooler 129 in the charge air subsystem.

Exhaust gasses from the exhaust ports of the cylinders 50 flow from the exhaust manifold assembly 125 into the inlet of the turbine 121, and from the turbine's outlet into the exhaust outlet channel 128. In some instances, one or more after-treatment devices 162 are provided in the exhaust channel 128. Exhaust may be recirculated via a high-pressure EGR channel 131 which obtains exhaust from the channel 124 at a point between the exhaust manifold 125 and the input to the turbine 121 and delivers exhaust for mixing with fresh charge air at a point between the output of the compressor 122 and the supercharger input 151. Alternatively (or additionally) exhaust may be recirculated via a low-pressure EGR channel 131$_{LP}$ which obtains exhaust at a point between the exhaust outlet 128 and the output of the turbine 121 and delivers exhaust for mixing with fresh charge air upstream of the input to the compressor 122. Presuming that the air handling system includes a high-pressure EGR channel, a portion of the exhaust flowing out of the manifold 125 is recirculated through the EGR channel 131, under control of the EGR valve 138. The EGR channel 131 is coupled to the charge air subsystem via the EGR mixer 163. In some instances, although not necessarily, an EGR cooler 164 is provided in the EGR channel 131, in series between the EGR valve 138 and the EGR mixer 163. In other instances, there may be no cooler in the EGR channel 131. As per FIG. 2, a low-pressure EGR channel may be similarly constructed.

With further reference to FIG. 2, the air handling system 80 is equipped for control of gas flow at separate control points in the charge air and exhaust subsystems. In the charge air subsystem, charge air flow and boost pressure are controlled by operation of a recirculation path 165 coupling the output 152 of the supercharger to the supercharger's input 151. The recirculation path 165 includes a valve (the "recirculation valve") 166 that governs the flow of charge air into, and thus the pressure in, the intake manifold 130. A valve (the "backpressure valve") 170 in the exhaust outlet 128 governs the flow of exhaust out of, and thus the backpressure in, the exhaust subsystem. As per FIG. 2, the backpressure valve is positioned in the exhaust outlet 128, between the output of the turbine 121 and the after-treatment devices 162.

In some instances, additional control of gas flow (and pressure) is provided by way of a variable speed supercharger and/or a variable-geometry turbine. Thus, in some aspects the supercharger 110 is coupled by a drive mechanism (not shown) to a crankshaft, or another rotating element of the engine, to be driven thereby. The drive mechanism can comprise a stepwise transmission, or continuously variable transmission (CVT), device, in which cases, charge air flow, and boost pressure, may be varied by varying the speed of the supercharger 110 in response to a speed control signal provided to the drive mechanism. In other instances, the supercharger may be a single-speed device. In other aspects, the turbine 121 may be a variable-geometry device having an effective aspect ratio that may be varied in response to changing speeds and loads of the engine.

FIG. 3A shows a fuel injection system that may be configured to implement a low-reactivity combustion operation according to this specification by injecting predetermined charges of low reactivity fuel into a combustion chamber. The fuel injection system 180 delivers low reactivity fuel to each cylinder 50 by injection into the cylinder. Preferably, each cylinder 50 is provided with multiple fuel injectors mounted for direct injection into cylinder space between the end surfaces of the pistons. For example, each cylinder 50 has two fuel injectors 68 and 70. Preferably, fuel is fed to the fuel injectors 68 and 70 from a low-reactivity fuel source 182 that includes a rail/accumulator mechanism to which fuel is pumped by a fuel pump 183. A fuel return manifold 184 collects fuel from the fuel injectors 68 and 70 and the fuel source 182 for return to a reservoir from which the fuel is pumped. Although FIG. 3A shows the fuel injectors 68 and 70 of each cylinder disposed at an angle of less than 180°, this is merely a schematic representation and is not intended to be limiting with respect to the locations of the injectors or the directions of the sprays that they inject.

Figure 3B:
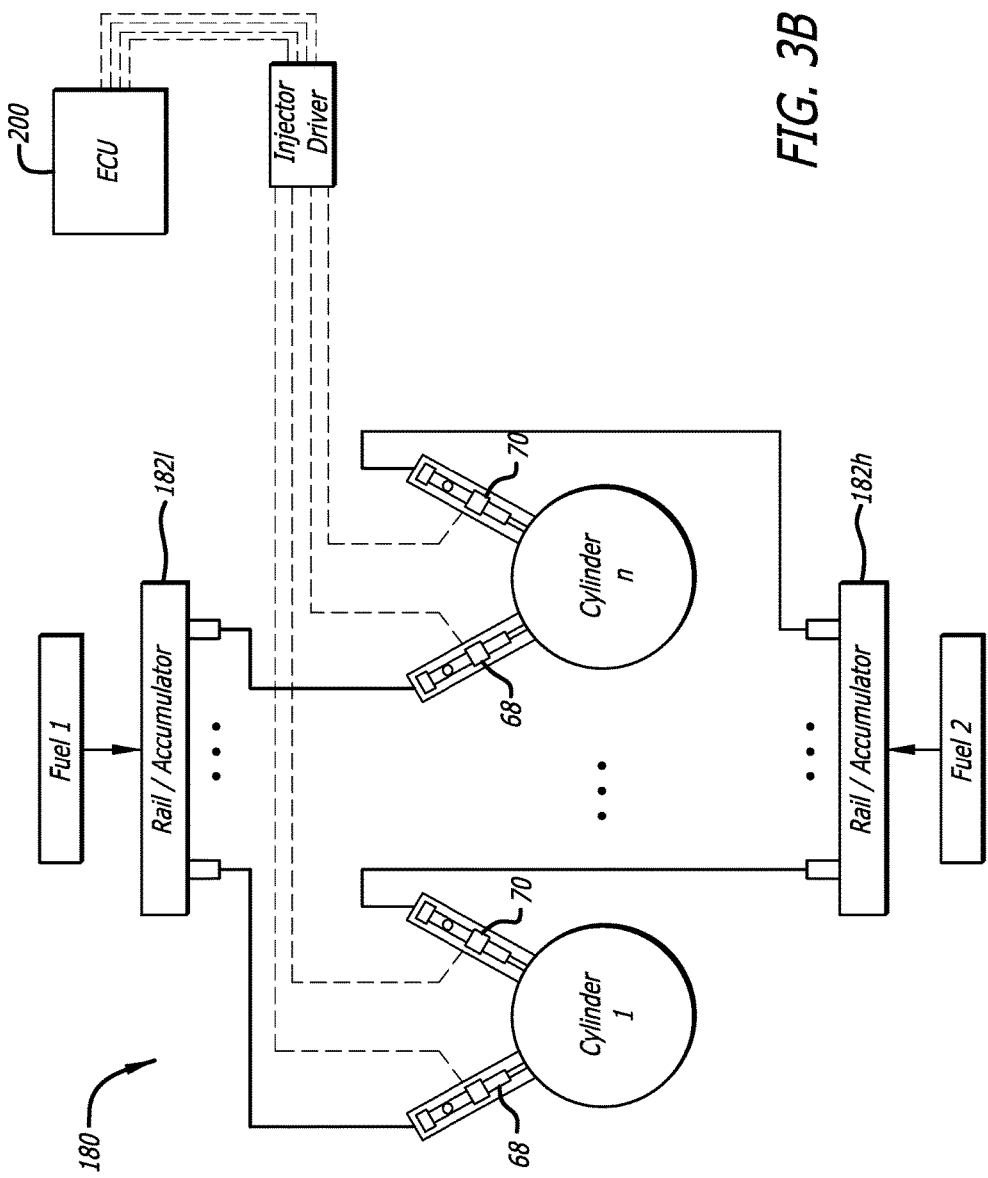
FIG. 3B is a schematic diagram showing an alternate fuel injection system for a compression-ignition, opposed-piston engine according to this disclosure.
Figure 3C:
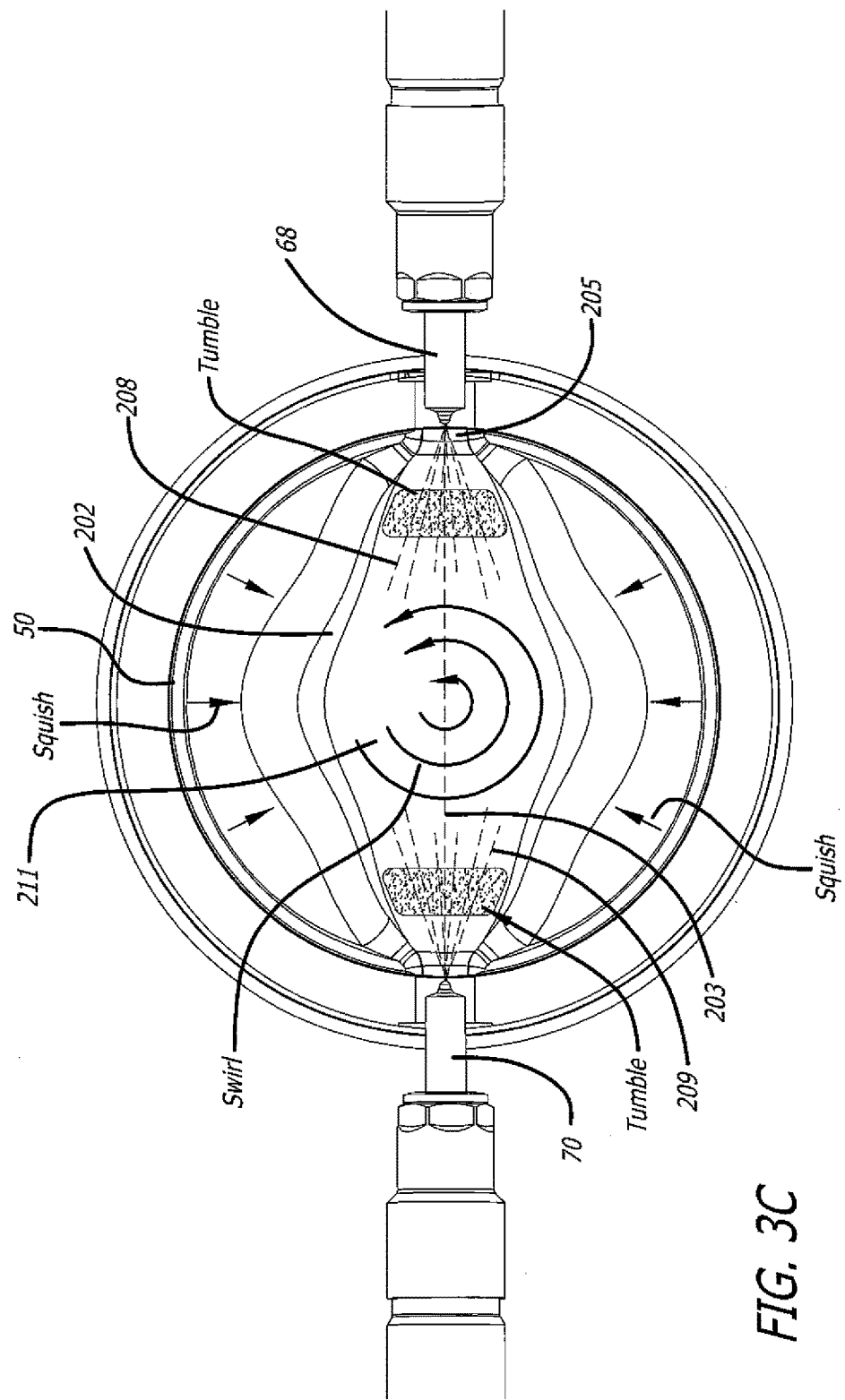
FIG. 3C is a schematic drawing showing a combustion chamber defined between the end surfaces of a pair of opposed pistons according to this disclosure and a pattern of fuel injection into the combustion chamber.

In one preferred configuration, best seen in FIG. 3C, the injector nozzles 68 and 70 are disposed for injecting fuel sprays in diametrically opposing directions along an injection axis. Preferably, each fuel injector 68 and 70 includes, or is associated with, an electrically-operated actuator (such as a solenoid) that operates the injector. Preferably, the actuator is controlled by a respective drive signal produced by an electronic multichannel injector driver 186.

FIG. 3B shows an alternate embodiment of a fuel injection system that may be configured to implement a low-reactivity combustion operation according to this specification by injecting predetermined charges of low reactivity fuel and high reactivity fuel into a combustion chamber. The fuel injection system 180, via rail accumulator 182$l$, delivers low reactivity fuel ("Fuel 1") to each cylinder 50 by injection into the cylinder through injectors 68. The fuel injection system 180, via rail accumulator 182$h$, delivers high reactivity fuel ("Fuel 2") to each cylinder 50 by injection into the cylinder through injectors 70. With this construction, each cylinder 50 has two fuel injectors 68 and 70, which give the ECU 200 the ability to dynamically vary the reactivity of fuel delivered by adjusting the component amounts in response to engine operating conditions.

With reference again to FIG. 3C, as a pair of opposed pistons move through their respective TC locations, their adjacent end surfaces form a combustion chamber 202 having a shape that operatively interacts with swirl and squish flows of pressurized charge air to generate one or more tumble flows of air in the combustion chamber. Preferably, the combustion chamber 202 has an elongated, bilaterally symmetrical shape referenced to an injector axis 203, and a pair of injector ports 205 located on the injector axis 203. Opposing spray patterns of fuel 208, 209 injected through injection ports in the cylinder 50 into the combustion chamber 202 via the injectors 68 and 70, which are opposed diametrically along the axis 203. The fuel spray patterns 208, 209 travel in opposing directions along the axis 203, and meet in the central portion 211 of the combustion chamber where they mix with a largely spherical flow field of swirling charge air. The tumble flows result from interactions of swirl and squish as described in U.S. patent application Ser. Nos. 13/066,589, 13/843,686, and 14/117, 831. The tumble flows circulate around the injector axis 203 and act jointly with the swirl in the combustion chamber central portion 211 to create a spherical flow field. As injection continues, the swirling mixture of air and fuel is increasingly compressed in the combustion chamber. When the mixture reaches an ignition temperature, fuel ignites in the combustion chamber. In some instances, both fuel spray patterns 208, 209 are constituted of low reactivity fuel. In other instances, one of the spray patterns is constituted of low reactivity fuel and the other of high reactivity fuel.

Figure 4:
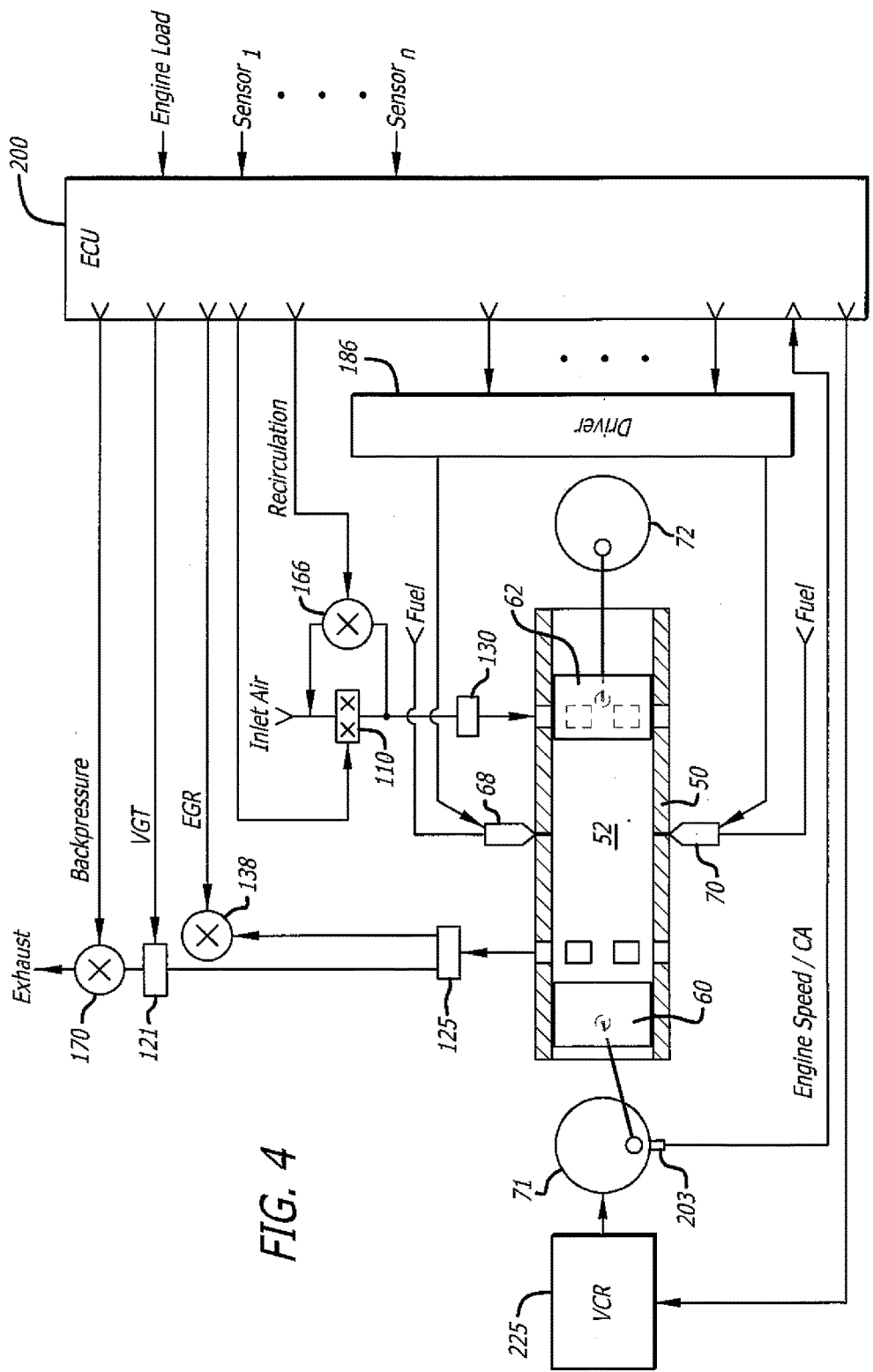
FIG. 4 is a schematic diagram illustrating a two-stroke cycle, opposed-piston engine equipped for low reactivity, compression-ignition (LRCI) according to this disclosure.

As seen in FIG. 4, the ECU 200 may be configured to control low reactivity, compression ignition in a two-stroke cycle, opposed-piston engine in response to specified engine operating conditions by automatically operating the valves 138, 166, and 170 (and, possibly other valves), the supercharger 110, if a multi-speed or variable speed device is used, and the turbo-charger 121, if a variable-geometry device is used. Of course, operation of valves and associated elements used for EGR can include any one or more of electrical, pneumatic, mechanical, and hydraulic actuating operations. For fast, precise automatic operation, it is preferred that the valves be high-speed, computer-controlled devices with continuously-variable settings. Each valve has a state in which it is open (to some setting controlled by the ECU 200) to allow gas to flow through it, and a state in which it is closed to block gas from flowing through. In some aspects, the ECU 200 may be configured to control and operate the air handling system in a manner based on the disclosure in related U.S. patent application Ser. No. 14/039,856.

The ECU 200 may further be configured to operate the air handling system and its EGR component so as to control combustion by governing amounts of pressurized charge air and exhaust products trapped in the combustion chamber. Examples of air handling and/or combustion control for two-stroke cycle, compression-ignition, opposed-piston engines are described in U.S. Pat. No. 8,549,854, U.S. application Ser. No. 13/782,802 (published as US 2013/0174548), U.S. application Ser. No. 13/926,360, U.S. application Ser. No. 13/974,883, and U.S. application Ser. No. 13/974,935. One of the functions of these control regimes is to determine and adjust the temperature of trapped mass in a cylinder.

As per FIGS. 3A, 3B, and 4, the ECU 200 may be configured to control a fuel injection mechanization according to fuel injection control schedules in response to measured parameter values obtained from engine sensors. These control schedules cause the generation of output control signals that are coupled to one or more fuel reservoirs, one or more fuel pumps, and the injector driver. In response to the control signals, the injector driver 186 generates drive signals on separate dedicated channels to operate fuel injectors. In some aspects, the ECU 200 may be configured to control and operate a fuel injection system in a manner based on the disclosure in related U.S. patent application Ser. No. 13/654,340

As per FIG. 4, the engine is also equipped with a variable compression ratio (VCR) mechanism 225 for varying the engine's compression ratio in response to operating conditions. Preferably, although not necessarily, the mechanism 225 operates by varying the phasing between the crankshafts 71 and 72 in response to signals produced by the ECU 200. Preferably, the VCR mechanism 225 controls crankshaft phasing by varying the crank angle of at least one crankshaft, where the crank angle is an angle of rotation of the crankshaft with respect to the angle which places a piston connected to the crankshaft at a specific point in its slidable movement. For example, the specific point could be the top center (TC) position of the piston. Such a mechanism is disclosed in U.S. application Ser. No. 13/858,943.

Since each injector 68, 70 contributes to meeting the total full load fuel flow requirements in each cycle of engine operation, each injector may be sized to provide one half of the total fuel injected. This configuration allows the injectors to control low injection quantities in comparison to what injection flow would be required if only a single injector had to supply the full fuel load. By controlling each injector independently, the dwell time between each injection can be reduced by cycling one injector in reference to the other injector. The dual injectors also allow for numerous, smaller injections in any one cycle that can supply large fuel quantity to be injected without creating a significant momentum to the injections, thereby enabling the combustion chamber to contain the fuel air mixture within the chamber parameters and avoid fuel impingement on the cylinder bore wall.

Variable crank phasing may be added to the in-cylinder trapped fuel/air composition, fuel system flexibility, and temperature control through charge air control including EGR control, so as to provide the engine with enablers operative to manage variable combustion strategies. Variable crank phasing provides timing and duration of exhaust blow-down (scavenging), expansion of the compression ratio as well as dynamic control of compression ratio itself. Increasing the compression ratio dynamically provides an important lever to assure ignition and good combustion stability at low loads and low speeds. At high loads, the compression ratio may be lowered to avoid premature ignition that can produce severe knocks in the engine. Crank phasing also changes the scavenging process in a way that is synergistic with the compression ratio.

Use of a low reactivity fuel in a two-cycle, opposed-piston, compression-ignition engine with the charge air management system of FIG. 2 provides the potential to control the trapped temperature, trapped pressure, and EGR content in a highly efficient, clean running operation. At low loads, the supercharger recirculation loop may be operated to minimize the amount of charge air flow through the engine so as to maximize the amount of internal residual to increase the trapped charged air temperature thereby helping to ignite the fuel at the precise, most efficient moment. As the load increases, the amount of energy transferred to the turbocharger increases and therefore the boost to the pressurized intake air is increased. The EGR rate can be individually controlled from the trapped temperature by controlling the amount of cooled EGR that recirculates. The variable geometry turbocharger (VGT) can also be used to change the boost of pressurized air to the intake manifold and also the back-pressure to obtain the desired combination of both. The three air control systems, EGR rate, boost pressure, and air flow, are controlled by three actuators under direction of the ECU, (the EGR valve, the supercharger recirculation valve and the VGT).

Further improvements over diesel-only compression-ignition are possible. For example, use of a low-reactivity fuel may enable reduction of the number of after-treatment devices 162 necessary to maintain low emission levels in a two-stroke cycle, compression-ignition, opposed-piston engine. In this regard, use of low reactivity fuel may permit simplification, if not elimination, of diesel particulate filtration and/or selective catalytic reduction devices.

Although the air handling system shown in FIG. 2 is preferred, it should be understood that many variations of this construction are possible.

Although this application describes particular parameters for incorporating low reactivity gasoline as a fuel of choice for a two-stroke cycle, compression-ignition, opposed-piston engine it should be understood that other parameters for using a low reactivity fuel could be incorporated and therefore the application is limited only by the claims that follow.

Operating Point Example: An example of a multi-cylinder LRCI opposed-piston engine configured for low emissions includes two opposed injectors per cylinder for low reactivity liquid fuel injection, a supercharger with fixed speed ratio, multiple speed ratios or fully variable speed ratio, a variable geometry turbocharger, variable crank phasing, a high-pressure EGR channel ("external EGR"), and retained burn fraction mass ("internal EGR"). As an example for achieving LRCI conditions, the engine settings can be adjusted as follows. For an engine speed of 1300 RPM with a BMEP of 3 bar, which corresponds to a speed and load typical of a light duty emission cycle load point, the key engine injection system operating parameters may be set as follows:

Fuel mass injected per cylinder: 13 mg/rev/cylinder
Fuel injection pressure: 500 Bar
Injection 1: 4 mg @85 deg BMinVol
Injection 2: 5 mg @55 deg BMinVol
Injection 1: 4 mg @15 deg BMinVol The air system setpoints for achieving combustion at this load point may be set to:
Boost pressure: 1.15 Bar
Charge temperature: 330 K
Scavenge ratio: 0.7
Internal EGR: 35%
External EGR: 30%
Burnt gas fraction: 65%
Trapped charge temperature: 415 K
Trapped air fuel ratio: 30

These conditions would allow ignition of the low reactivity fuel to reach 50 of the mass fraction burn 2 degrees after the minimum volume, a combustion duration of less than 8 degrees while maintaining low rate of pressure rise and achieving NOx levels below 0.2 g/kWh and insignificant soot emissions.

This illustrates not only the capability to manage internal EGR with great flexibility to achieve the necessary temperature and charge composition necessary but also the ability to mix and efficiently and cleanly burn the low reactivity fuel without ignition assistance at low loads.

Although principles of low reactivity, compression ignition operation of an opposed-piston engine have been described with reference to presently preferred embodiments, it should be understood that various modifications can be made without departing from the spirit of the described principles. Accordingly, the patent protection accorded to these principles is limited only by the following claims.

The invention claimed is:

1. A two-stroke cycle, compression-ignition, opposed-piston engine including at least one cylinder (50) with longitudinally-separated exhaust (54) and intake (56) ports, a pair of pistons (60, 62) disposed in opposition to one another in a bore (52) of the cylinder and a fuel injection system for injecting fuel into a combustion chamber formed in the bore between the end surfaces of the pistons during a compression stroke of the engine, characterized in that:
the combustion chamber has a shape that operatively interacts with swirl and squish flows of charge air to generate one or more tumble flows of air in the combustion chamber;
the fuel injection system includes at least two fuel injectors (68, 70) mounted to the cylinder for injecting fuel into the combustion chamber;
the fuel injection system includes a first rail accumulator for delivering a low reactivity fuel to a first fuel injector of the at least two fuel injectors and a second rail accumulator for delivering a high reactivity fuel to a second fuel injector of the at least two fuel injectors; and
the engine includes an engine control unit capable of varying the reactivity of fuel by causing injection of predetermined charges of the low reactivity fuel and the high reactivity fuel in response to engine conditions.

2. A method of operating the two-stroke cycle, compression-ignition, opposed-piston engine of claim 1, by:
admitting charge air into the bore through the intake port as the pistons move from respective bottom center positions in the bore;
swirling the charge air as it is admitted into the bore;
forming said combustion chamber (202) between end surfaces (61, 63) of the pistons as the pistons approach top center locations in the bore; and,
injecting one or more spray patterns (208, 209) of low reactivity fuel into the combustion chamber.

3. The method of claim 2, in which the low reactivity fuel is gasoline.

4. The method of claim 2, in which the step of injecting one or more spray patterns includes injecting opposing spray patterns (208, 209) of low reactivity fuel in opposing directions along an injection axis (203) of the combustion chamber.

5. The method of claim 4, in which the low reactivity fuel is gasoline.

6. The method of claim 2, in which the step of injecting one or more spray patterns includes injecting first and second spray patterns (208, 209) of fuel in opposing directions along an injection axis (203) of the combustion chamber, in which the first spray pattern includes the low reactivity fuel and the second spray pattern includes a high reactivity fuel.

7. The method of claim 6, in which the low reactivity fuel is gasoline and the high reactivity fuel is diesel.

8. The method of any one of claims 2-7, further including generating tumble in swirling charge air in the combustion chamber.

9. The method of any one of claims 2-7, in which the engine further includes a variable compression ratio mechanism (225), the method further including varying the compression ratio of the engine in response to engine speed.

10. The method of claim 9, in which the compression ratio of the engine is varied by varying phasing between crankshafts of the engine.

* * * * *